(No Model.)
G. A. TRUE.
VALVE.
No. 549,978.    Patented Nov. 19, 1895.
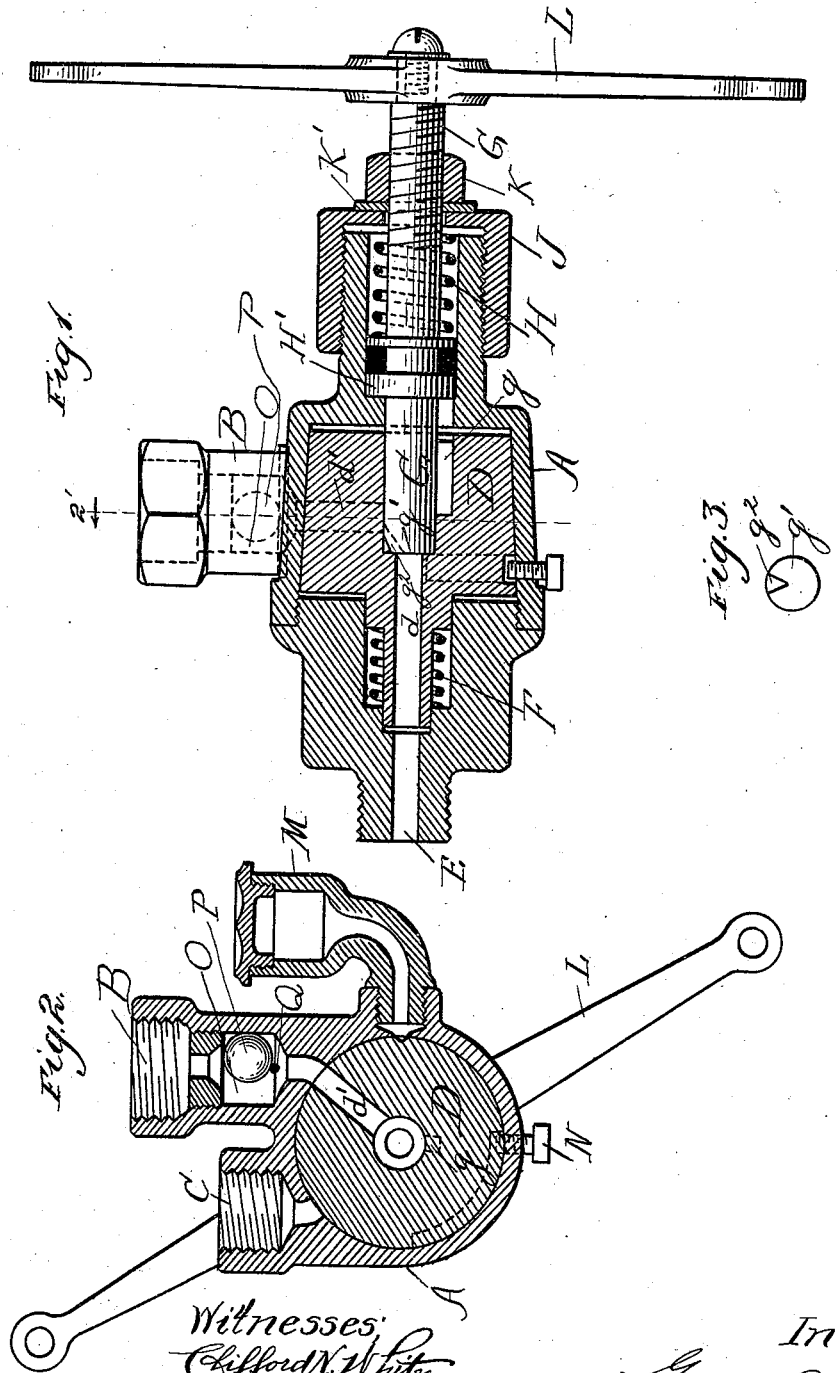
Witnesses:
Clifford N. White
Florence Embrey
Inventor:
George A. True
By Walter H. Chamberlin
Atty.

UNITED STATES PATENT OFFICE.

GEORGE A. TRUE, OF CHICAGO, ILLINOIS.

VALVE.

SPECIFICATION forming part of Letters Patent No. 549,978, dated November 19, 1895.

Application filed March 13, 1895. Serial No. 541,567. (No model.)

*To all whom it may concern:*

Be it known that I, GEORGE A. TRUE, a citizen of the United States, residing at Chicago, county of Cook, State of Illinois, have invented a certain new and useful Improvement in Valves; and I declare the following to be a full, clear, and exact description of the invention, such as will enable others skilled in the art to which it pertains to make and use the same, reference being had to the accompanying drawings, which form a part of this specification.

My invention has for its object the production of a valve for use more particularly, although not necessarily, in connection with pneumatic hoisting apparatus, and also the production of a safety attachment for said valve, whereby a sudden release of the air-pressure due to the breaking of the pipe supplying the compressed air may be prevented.

The invention consists in a combination of devices and appliances hereinafter described and claimed.

In the drawings, Figure 1 is a longitudinal section through the valve, and Fig. 2 is a cross-section.

In carrying out the invention, A represents the casing of the valve; B, the inlet or air-supply port; C, the exhaust-port; D, the main plug of the valve, having the longitudinal bore or port $d$ and the transverse or radial port $d'$; E, the port communicating with $d$ and admitting the air to or from the cylinder, and F a spring to keep the plug D always to its seat.

G is the operating-stem of the plug D, and instead of being rigid with the plug, as is usually the case, it is movable longitudinally in the plug, but is prevented from rotating by the feather $g$. The end $g'$ of this stem terminates adjacent to the point where the port $d'$ joins the port $d$. In the end of the stem G is a tapered groove $g^2$, and the arrangement of the parts is such that the small end of the groove is normally the only communication between the ports $d$ and $d'$.

H is a spring adapted to normally keep the stem G to the position shown in Fig. 1.

H' is a collar on the stem G, adapted to prevent the spring H from throwing the stem beyond its normal position and also to form a bearing for the stem when rotated in its normal position.

J is a nut adapted to regulate the pressure of the spring H, and consequently to regulate the pressure which the stem G will withstand before moving longitudinally, and thus increasing the size of the opening from the port $d'$ to the port $d$.

K is a nut, and K' a washer adapted to limit the longitudinal play of the stem, and consequently to regulate the extent to which the groove $g$ shall normally permit the passage of air from the port $d$ to the port $d'$, and vice versa.

L is a handle whereby the stem G, and consequently the plug D, may be rotated.

M is an oil-cup provided with a duct leading to the face of the plug D for the purpose of lubricating it, and N is a set-screw, the end of which enters a groove in the face of the plug to limit the revolution of the plug.

O is an enlargement or chamber in the supply-pipe, and P is a ball located therein, a pin Q being provided to prevent the ball from closing the passage from the chamber O to the port $d'$. It will be observed that the purpose of this ball is to form a safety attachment to the valve and apparatus. The air-supply entering at B will easily pass the ball P and enter the port $d'$ and thence pass by the usual channels to the cylinder; but should the air-supply pipe burst (as is very apt to be the case in this class of apparatus where a flexible hose is generally used) the back-pressure of air from the cylinder will at once force the ball P up to the seat $b$, and thus check the back flow until the valve can be turned.

The operation of the valve is as follows: The plug is turned until the port $d'$ registers with the inlet B. The air passes through the port $d'$, through the small end of the groove $g^2$, through the port $d$, and through the port E to the cylinder. We will suppose that the spring H is regulated by the nut or sleeve J to withstand a given pressure—say $x$. When the pressure in the cylinder reaches $x$, the stem G will move longitudinally sufficiently to bring the larger portion of the groove $g^2$ opposite the port $d'$, and thus admit a sufficient pressure of air to move the load. Thus, no matter what the load may be and no matter what the pressure of air in the supply-pipe, (provided it is enough to move the load,) the stem G will so regulate the admission of air to the cylinder as to move the load at a given speed. When it is desired to stop the upward movement of the load, the plug is turned so that the port $d'$ is between the ports B and C, and when it is desired to lower the load the plug is turned so that the port $d'$ registers with the port C.

It will thus be seen that I have dispensed with a regulating-valve as a valve alone and have combined it with the stem of the valve-plug, thereby greatly simplifying the construction and insuring a more accurate operation, while by the safety attachment I have provided against an accidental releasing of the load.

What I claim is—

1. A valve for a pneumatic hoist consisting of a plug adapted to connect either the supply pipe or the exhaust with the cylinder and the plug stem, said stem being movable and forming an auxiliary valve to govern the passage of air through the plug, substantially as described.

2. A valve for a pneumatic hoist consisting of a casing having inlet and exhaust ports, and a common port to the cylinder, a plug provided with a port adapted to connect the cylinder port with either the supply or exhaust port, and the operating stem of said plug said stem forming a valve governing the passage of air through the plug port, said stem incapable of revolution independent of the plug, but capable of longitudinal movement independent thereof, substantially as described.

3. A valve for a pneumatic hoist consisting of a plug having a port adapted to connect the cylinder port with either the supply port or the exhaust port, and the stem of said plug said stem being capable of longitudinal movement in the plug but incapable of revolution independent thereof, said stem forming a valve governing the passage of air through the plug, and means for setting the stem in any desired longitudinal position, substantially as described.

4. A valve having a plug with a port therethrough, the operating stem of said plug automatically adjustable in the direction of its length, whereby through it the passage of fluid through the plug port may be regulated and a spring for keeping it normally in one position, substantially as described.

5. A valve having a plug with a port therethrough the operating stem of said plug automatically adjustable in the direction of its length whereby through it the passage of fluid through the plug port may be regulated, a spring for keeping the stem normally in one position and means for regulating the desired normal position, substantially as described.

6. A valve for a pneumatic hoist consisting of a plug having a port adapted to connect the cylinder port with either the supply or exhaust port, said plug provided with an operating stem capable of longitudinal movement in the plug but incapable of revolution independent thereof, said stem having in its end a graduated groove forming the port for the passage of air past the stem and a spring for keeping the stem normally in such a position that the restricted port is at its smallest opening, means for regulating the pressure on said spring consisting of the nut J and a lock nut K for adjusting the stem independent of the spring, substantially as described.

In testimony whereof I sign this specification in the presence of two witnesses.

GEORGE A. TRUE.

Witnesses:
 W. H. CHAMBERLIN,
 FLORENCE EMBREY.